United States Patent
Husted et al.

(10) Patent No.: US 6,728,602 B2
(45) Date of Patent: Apr. 27, 2004

(54) CONTROL SYSTEM FOR AN ELECTRIC HEATER

(75) Inventors: Harry L. Husted, Kokomo, IN (US); Gordon D. Cheever, Jr., Peru, IN (US); Clinton W. Erickson, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 10/099,897

(22) Filed: Mar. 15, 2002

(65) Prior Publication Data

US 2003/0176953 A1 Sep. 18, 2003

(51) Int. Cl.$^7$ ............................................... G05D 23/24
(52) U.S. Cl. ..................... 700/299; 219/110; 392/318
(58) Field of Search ..................... 700/299; 323/299; 392/318; 219/110; 209/576

(56) References Cited

U.S. PATENT DOCUMENTS

| | | | |
|---|---|---|---|
| 3,718,506 A | 2/1973 | Fischer et al. ................ | 136/86 |
| 3,924,102 A | 12/1975 | Hanekom .................... | 219/497 |
| 4,162,379 A | 7/1979 | Sebens et al. ............... | 219/497 |
| 5,838,145 A | 11/1998 | Poon et al. .................. | 323/266 |
| 5,923,158 A * | 7/1999 | Kurokami et al. .......... | 323/299 |
| 6,233,397 B1 * | 5/2001 | Offir ........................... | 392/378 |
| 6,271,506 B1 | 8/2001 | Glaser ........................ | 219/505 |
| 6,293,941 B1 * | 9/2001 | Strul et al. .................. | 606/34 |
| 6,547,810 B1 * | 4/2003 | Sharkey et al. ............... | 607/96 |

FOREIGN PATENT DOCUMENTS

| EP | 0708397 | 4/1996 |
|---|---|---|
| JP | 2001-106513 | 4/2001 |

* cited by examiner

Primary Examiner—Albert W. Paladini
(74) Attorney, Agent, or Firm—Jimmy L. Funke; Stefan V. Chmielewski (57) ABSTRACT

A control system for an electric heater, e.g., an electric catalyst heater (ECH), includes a current sensor, a voltage sensor, a switching element, and a control circuit. The control circuit is coupled to the current sensor, the voltage sensor and a control terminal of the switching element and varies a control signal on the control terminal to maintain the temperature of the heating element within a predetermined temperature range.

20 Claims, 6 Drawing Sheets

CONTROL SYSTEM FOR AN ELECTRIC HEATER

TECHNICAL FIELD

The present invention is generally directed to a control system, and, more specifically, to a control system for an electric heater.

BACKGROUND OF THE INVENTION

Electric catalyst heaters (ECHs) have been proposed for use in a variety of applications, such as a micro-reformer, a main fuel reformer, electrically heated catalytic converters and in other applications that implement a low impedance heating element that requires temperature control such as furnaces and ovens. When implemented within a micro-reformer, an ECH is used to warm a reformer catalyst to initiate the reforming process. The fuel reforming process produces hydrogen, which can be used for fuel in a fuel cell or to help internal combustion engines (ICEs) meet super ultra low emission vehicle (SULEV) emission requirements. When implemented within a catalytic converter, an ECH typically also allows for reduced emissions due to light off (i.e. heating to a temperature where catalytic activity begins).

When implemented within a fuel reformer, a typical ECH element needs to be maintained at a temperature that corresponds to a very narrow resistance range. For example, an ECH may exhibit a resistance of thirty-five milliohms at 25° C. and forty-one milliohms at 525° C. As another example, a heating element may exhibit a resistance between twenty-five and one-hundred milliohms. Traditional resistance measurement techniques, which have involved using a bridge and a series measurement element, are generally ineffective at such low resistance levels. This is due to the fact that the series element must generally have a resistance much less than forty milliohms, a high power rating and allow for precise measurement with high accuracy. This combination of requirements is generally difficult and expensive to meet when attempting such resistance measurements with a bridge that uses a series measurement element.

What is needed is a control system that performs temperature control of a low impedance series element that is practical, economical and relatively accurate.

SUMMARY OF THE INVENTION

An embodiment of the present invention is directed to a control system for an electric heater, e.g., an electric catalyst heater (ECH), that includes a current sensor, a voltage sensor, a switching element, and a control circuit. The current sensor is positioned to sense a heating current through a heating element and the voltage sensor is positioned across the heating element to sense a heating voltage. The switching element includes a control terminal and is coupled between the heating element and a power supply to interrupt the heating current, through the heating element, responsive to a control signal on the control terminal. The control circuit is coupled to the current sensor, the voltage sensor and the control terminal of the switching element and varies the control signal to maintain the temperature of the heating element within a predetermined temperature range.

According to one embodiment of the present invention, the current sensor is a non-contact inductive current sensor. According to another embodiment of the present invention, the control circuit includes a microcontroller. According to the present invention, a temperature sensor is not required to monitor the temperature of the heating element and the heating element can be monitored without adding a costly high power series element, which, when implemented, produces additional heat. Further, when a microcontroller is utilized, high accuracy can be achieved through high-speed measurements. In one embodiment, the microcontroller is programmed to prevent overheating and subsequent damage of the heating element. A control system, according to the present invention, can be utilized with a heating element that requires rapid warm-up for use in various applications such as micro-reformers for solid oxide fuel cells (SOFCs).

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

The present invention is generally directed to a control system for an electric heater, e.g., an electric catalyst heater (ECH), that includes a current sensor, a voltage sensor, a switching element, and a control circuit. The current sensor is positioned to sense a heating current through a heating element and the voltage sensor is positioned across the heating element to sense a heating voltage. It should be appreciated that the voltage sensor may be positioned directly or indirectly (i.e., across the heating element and additional components) across the heating element. The switching element includes a control terminal and is coupled between the heating element and a power supply to interrupt the heating current, through the heating element, responsive to a control signal on the control terminal. The control circuit is coupled to the current sensor, the voltage sensor and the control terminal of the switching element and varies the timing of the control signal to maintain the temperature of the heating element within a predetermined temperature range.

While the discussion herein is primarily directed to fuel reformers for auxiliary power units (APUs) implemented in an automotive environment, it should be appreciated that the control system, described herein may be advantageously implemented in other environments that have similar requirements. When implemented in the automotive environment, an APU with a fuel reformer may provide power to operate various automotive accessories, e.g., heated seats, a heated windshield, power steering, power brakes, electric air conditioning, electromagnetic valve train systems, electric water pumps, navigation systems, sound systems, vehicle heating systems, telecommunication systems and may be used to run refrigeration units in commercial vehicles. Further, the hydrogen produced by the fuel reformer can also be mixed with vehicle fuel for more efficient combustion with reduced emissions.

Another application is an electric heater useful in providing heat to automotive passenger compartments for vehicles having ICEs with low heat rejection or having no ICE, such as an electric vehicle. Electrically heated windshields are also low-impedance heating elements that can benefit from temperature control to limit heating effects, depending on the thermal load (e.g., an iced windshield versus light snow). Additional applications include electric heating elements for furnaces and ovens.

Figure 1:
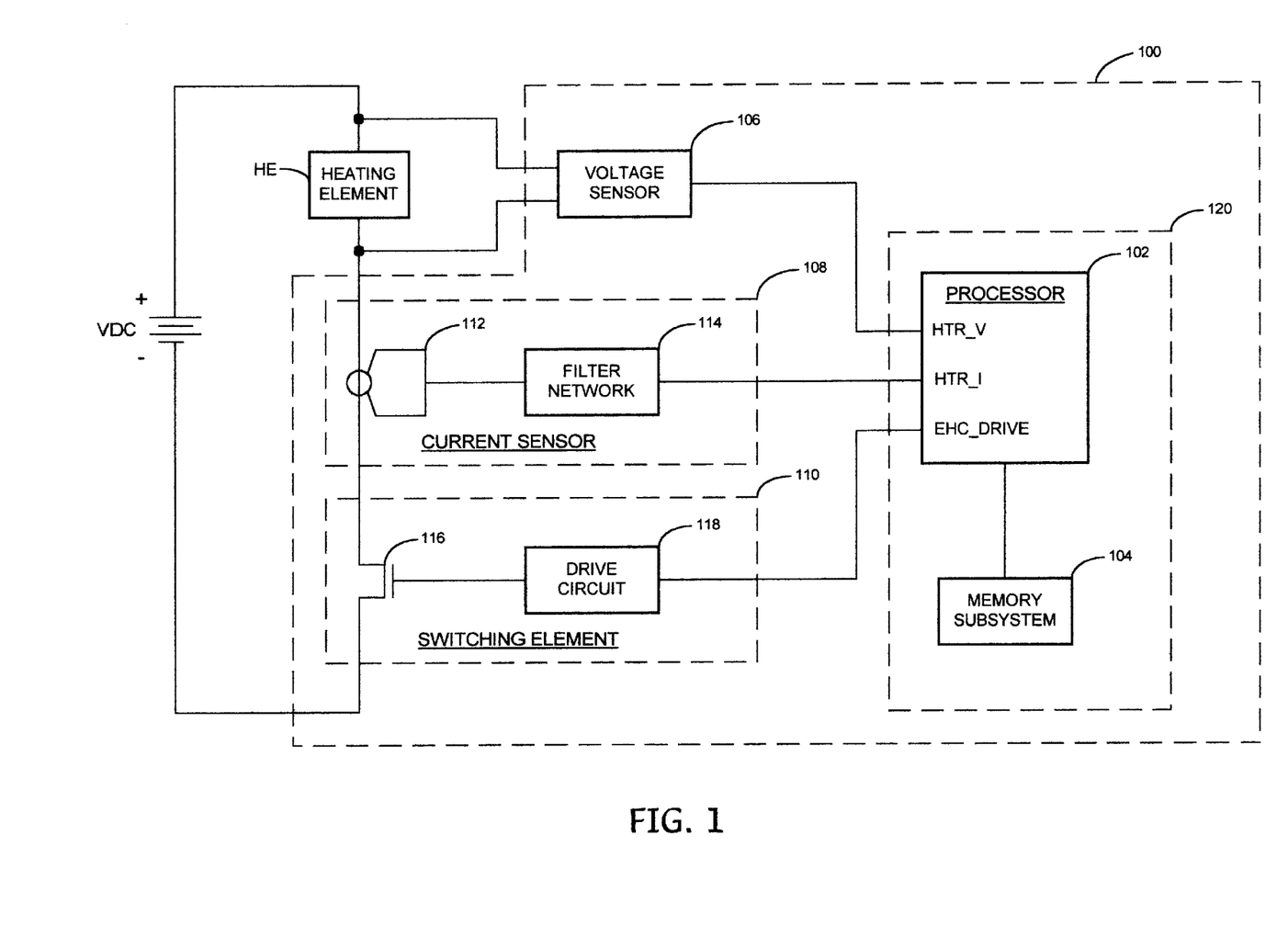
FIG. 1 is an exemplary electrical block diagram of a control system, according to an embodiment of the present invention.

FIG. 1 depicts an electrical block diagram of a control system 100 that monitors and controls the temperature of a heating element HE that receives power from a power supply VDC, which may be a battery, a series of batteries a generator, a fuel cell a DC-to-DC converter or other direct current electrical source. The control system 100 monitors the current through and the voltage across the heating element HE, provided by the power supply VDC, and modifies a control signal to maintain a required heating element HE temperature. Inputs of a voltage sensor 106 are coupled across the heating element HE and an output of the circuit 106 is coupled to an input HTR_V of a processor 102. A current sensor 108 senses the current through the heating element HE and provides an output signal to an input HTR_I of the processor 102.

In one embodiment, the current sensor 108 includes an inductive current sensor 112 that is coupled to a filter network 114. A control signal is provided by the processor 102 on an output EHC_DRIVE, which is coupled to a drive circuit 118 that is, in turn, coupled to a gate of a field effect transistor (FET) 116 that is part of a switching circuit 110. Alternatively, the FET 116 may be replaced with a high-current switching means, such as an isolated gate bipolar transistor (IGBT), bipolar junction transistor (BJT), or the like. The processor 102 is also coupled to a memory subsystem 104, which may include an application appropriate amount of volatile (e.g., static random access memory (SRAM)) and non-volatile memory (e.g., electrically erasable programmable read-only memory (EEPROM)). Alternatively, the processor 102 and the memory subsystem 104 may be incorporated within a microcontroller 120 or, in general, the functions associated with the processor 102 may be implemented by a control circuit. Elements 106, 114 and 118 can also be implemented within one or more integrated circuits.

Figure 2:
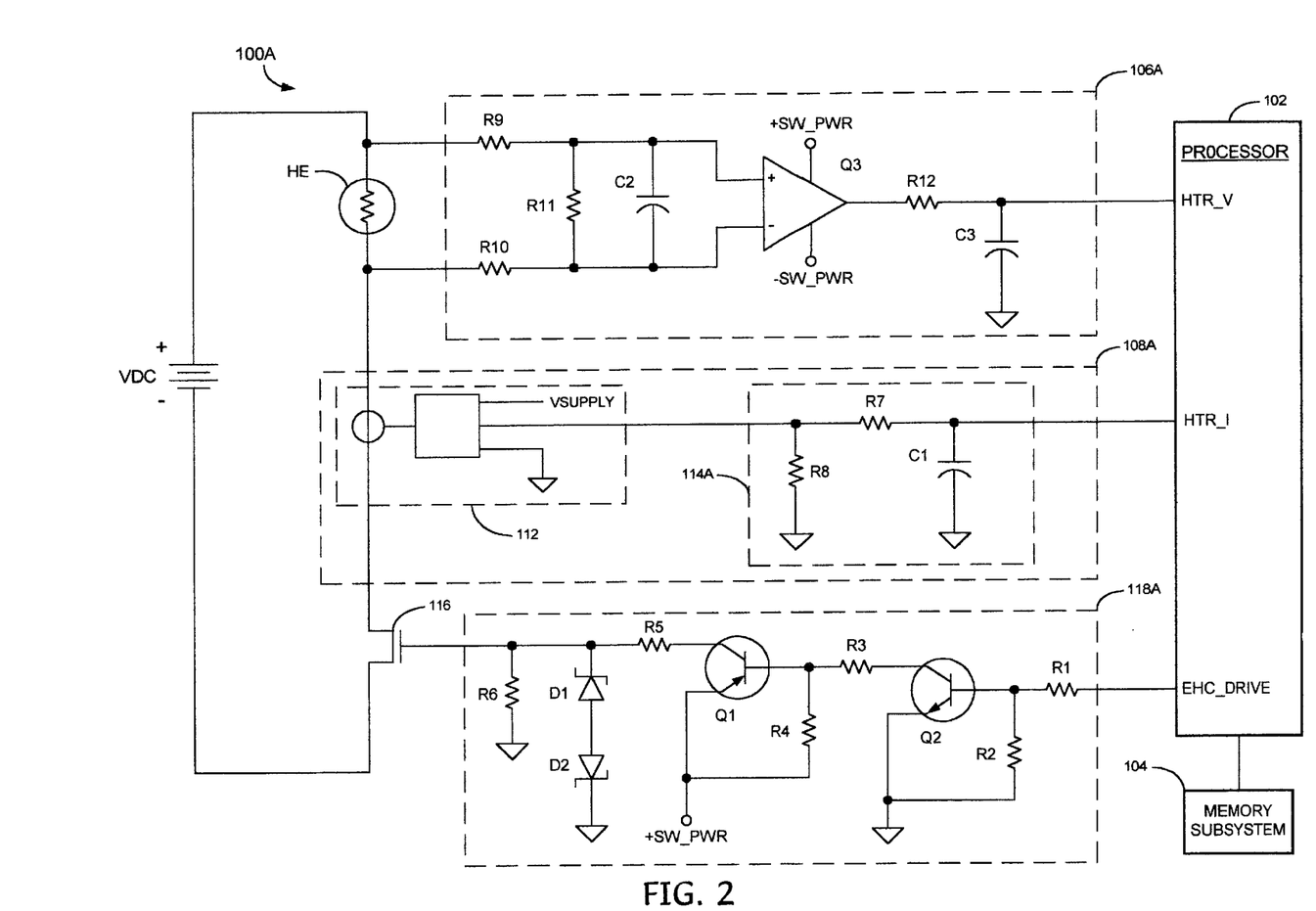
FIG. 2 is an exemplary electrical diagram, in block and schematic form, of a control system, according to another embodiment of the present invention.

FIG. 2 depicts an electrical diagram in block and schematic form of an exemplary control system 100A and further details an exemplary voltage sensor 106A, an exemplary current sensor 108A and an exemplary drive circuit 118A. The EHC_DRIVE output of the processor 102 is utilized to turn on/off the FET 116, when appropriate. A high level signal on the EHC_DRIVE output turns on NPN transistor Q2, which, in turn, turns on PNP tranisistor Q1, when an external power supply +SW_PWR is active. The transistor Q2, along with associated resistors R1 and R2 (e.g., 1 kohm and 430 ohm, respectively), invert the signal provided by the processor 102 on the EHC_DRIVE output. For example, when a five volt signal is provided on the EHC_DRIVE output, the transistor Q2 is turned on.

A resistor R3 (e.g., 150 ohm) limits a base current of the transistor Q1 and a resistor R4 (e.g., 2.2 kohm) is coupled between an emitter and a base of the transistor Q1 and ensures that transistor Q1 stays off when transistor Q2 is off. Resistors R3 and R4 also provide the collector current for transistor Q2. A collector of the transistor Q1 is coupled, via a resistor R5 (e.g., 20 ohm), to the gate of the FET 116. A cathode of zener diode D1 is coupled to the gate of the FET 116 and an anode of the zener diode D1 is coupled to an anode of zener diode D2. A cathode of the zener diode D2 is coupled to a common ground.

A resistor R6 (e.g., 510 ohm) is coupled between the gate of the FET 116 and the common ground. The diodes D1 and D2 serve to protect the gate of the FET 116 from negative and positive going transients. The resistor R6 pulls the gate of the FET 116 to the common ground when the transistor Q1 is turned off. When the transistor Q1 is conducting, a positive voltage is provided at the collector of the transistor Q1, which provides a turn on signal to the gate of the FET 116, through the resistor R5. A source of the FET 116 is coupled to a negative terminal of the power supply VDC and a drain of the FET 116 is coupled to one side of the heating element HE. A second side of the heating element HE is coupled to a positive terminal of the power supply VDC.

An output of an inductive current sensor 112 is coupled to an input HTR_I of the processor 102, via a filter network 114A. The output of the inductive current sensor 112 is filtered by the filter network 114A, which includes resistors R8 and R7 and a capacitor C1 (e.g., 220 kohm, 1 kohm and 0.033 uF, respectively), which provide, for example, a time constant of thirty microseconds. In this manner, the output of the inductive current sensor 112 is low-pass filtered before being provided to the HTR_I input of the processor 102.

The operational amplifier Q3 is differentially coupled across the heating element HE via a resistive divider network incorporating resistors R9, R10 and R11 (e. g., 1 kohm, 1 kohm and 1 kohm, respectively). A capacitor C2 (e.g., 0.033 uF) may be coupled across the inputs of the amplifier Q3 to filter noise and improve common mode rejection. An output of the amplifier Q3 is coupled through a low-pass filter, including resistor R12 and a capacitor C3 (e.g., 400 ohm and 0.15 uF, respectively) to the HTR_V input of the processor 102, which sets a time constant of approximately sixty microseconds. Alternatively, the time constant can be increased such that the voltage is averaged by the resistor R12 and the capacitor C3. In this manner, the processor 102 can periodically determine the voltage present at the HTR_V input and a current present at an HTR_I input and selectively provide a signal on the EHC_DRIVE output to control the temperature of the heating element HE within a predetermined temperature range.

Figure 3:
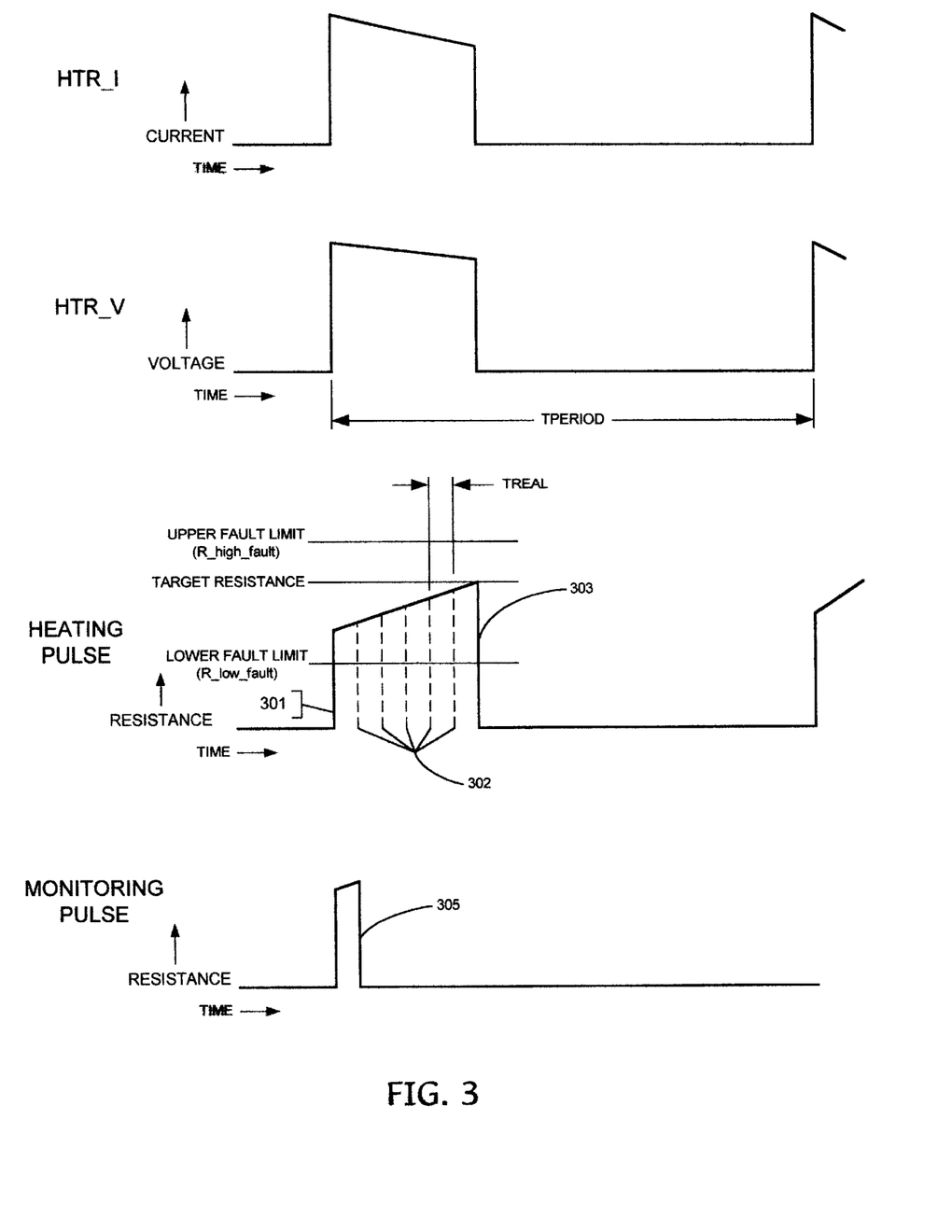
FIG. 3 is a signal diagram, according to an embodiment of the present invention.

Exemplary signals utilized to determine the temperature of the heating element HE are depicted in FIG. 3. The current signal HTR_I depicts an exemplary current passing through the heating element HE, as provided by the inductive current sensor 112 and the filter network 114A. The voltage signal HTR_V depicts an exemplary voltage across the heating element HE. The processor 102 periodically samples 302 the current HTR_I and the voltage HTR_V and calculates the resistance of the heating element HE, while the FET 116 is conducting, as is shown by the signal labeled "Heating Pulse." Based upon the current and voltage sensed, the processor 102 may lengthen or shorten the width of a pulse provided on the EHC_DRIVE output to maintain the temperature of the heating element HE within a predetermined temperature range. In one embodiment, the processor 102 is programmed with a lower fault limit (R_low_fault) and an upper fault limit (R_high_fault), as well as a target resistance.

Since the resistance of a resistive heating element varies in proportion to the temperature of the heating element, it is possible to estimate and control the temperature of the element by measuring and controlling the resistance of the element. As previously discussed, measurement of a low resistance series element is generally difficult due to the low resistance of the heating element HE. As previously discussed, the low resistance of the heating element HE makes it generally impractical to use an element in series with the heating element HE to determine the current through the heating element HE. This is because a series device would generally introduce a relatively large voltage drop and require a higher power device, since the product of the current, which can be as large as three-hundred amperes, and the voltage is relatively high. High power devices are often bulky, expensive and also reduce the power that can be transferred to the heating element HE and, as such, are generally inefficient.

In one embodiment, the current through heating element HE is measured by a non-contact inductive current sensor. As mentioned above, in one embodiment the output of the current sensor is passed through a simple filter (e.g., a RC) network with a time constant of approximately thirty microseconds. Alternatively, the time constant may be increased such that the current is averaged by the filter network 114A.

In one embodiment, the processor 102 implements a control and monitoring algorithm that switches the FET 116 on at a regular interval TPERIOD, which can be varied from interval to interval, if desired. Varying the interval TPERIOD may be particularly desirable during warm-up and cool-down phases. In one embodiment, the processor 102 implements a real-time execution scheme in which it performs a schedule of operations (e.g., measures the current through and the voltage across the heating element HE and calculates a corresponding resistance) at a regular fixed real-time interval TREAL, shown in FIG. 3. It is generally desirable that TPERIOD be significantly larger than TREAL to allow for adequate control resolution, In one embodiment. TPERIOD is at least one-hundred times larger than TREAL.

Figure 4:
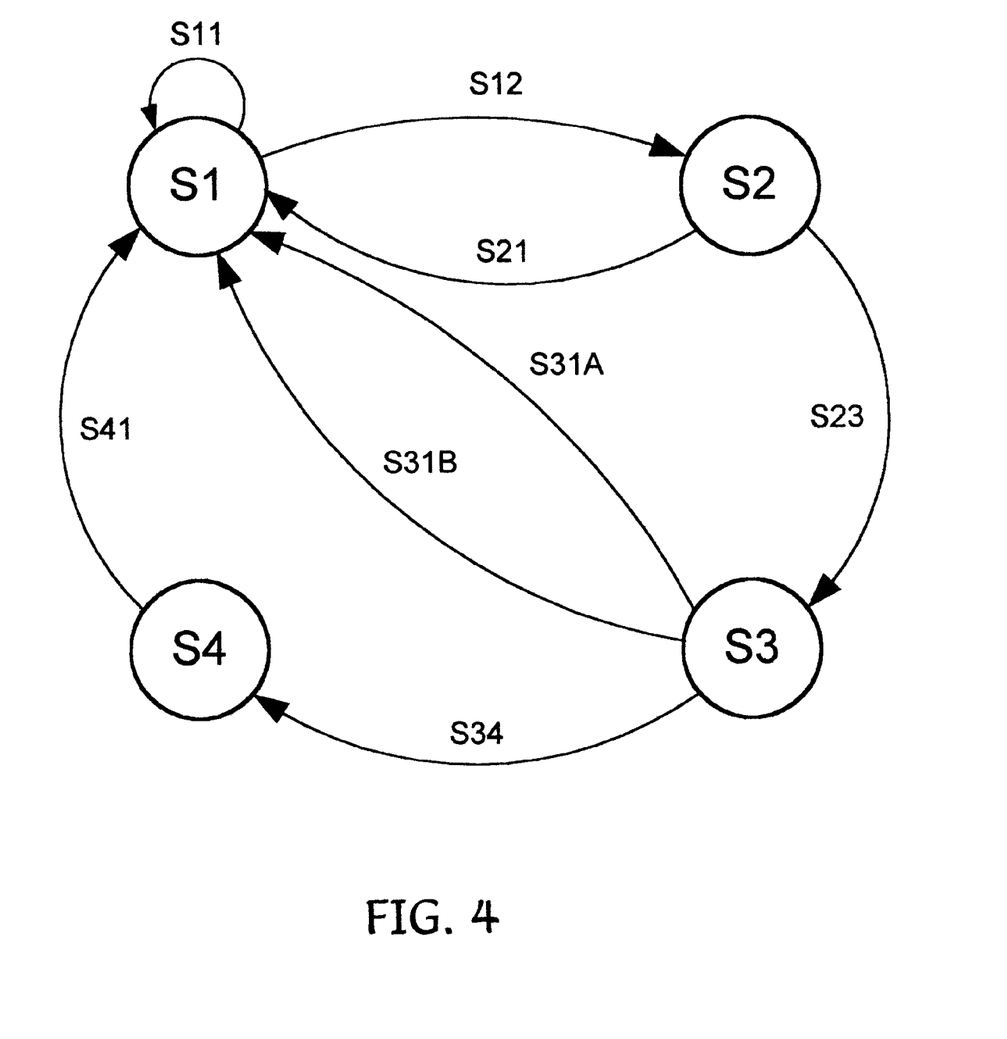
FIG. 4 is a state diagram detailing a sequential machine for implementing a control system, according to still another embodiment of the present invention.

FIG. 4 depicts a simplified state diagram of an exemplary sequential state machine, which can, for example, be implemented as a monitoring control routine on the processor 102. In state S1, the EHC_DRIVE output of the processor 102 is set to a low level. Upon power-up, after initializing various variables (i.e., Off_time, Local_on_time, ctr and DC_actual) the state machine transitions from state S1 to state S2 (i.e., S12) or loops on state S1 (i.e., S11) depending on whether an external enable signal is received and the counter (ctr) is greater than or equal to the variable Off_time, which tracks the time period that the drive signal on the EHC_DRIVE output should be low.

If the external enable signal is not provided, the next state is the present state, i.e., state S1. When the external enable signal is provided and the counter (ctr) is greater than or equal to the variable Off_time, the next state is state S2. In state S2, the processor 102 provides a high signal on the EHC_DRIVE output, performs a resistance calculation (Resistance_start) and initializes a current and voltage variable (Curr_start and V_start, respectively). The machine then transitions from the present state S2 to a next state S3 (along the path S23) when the counter (ctr) is less than the time period Local_on_time. When the counter (ctr) is greater than or equal to the time period Local_on_time in the present state S2, the next state is state S1. As is further discussed herein, this is utilized to initiate a "monitoring pulse" (see FIG. 3).

In state S3, the processor 102 measures the voltage across the heating element HE and the current through the heating element HE to perform a number of instantaneous resistance calculations, while the instantaneous resistance (R_instant) is less than or equal to a high fault threshold (R_highfault), greater than or equal to a low fault threshold (R_lowfault) or less than a target resistance (Target_R), or the counter (ctr) is less than the local on-time (Local_on_time). When the instantaneous resistance is greater than the high fault threshold or less than a low fault threshold, control transfers from the present state S3 to the next state S4 (along the path S34). In state S4, the EHC_DRIVE output of the processor 102 transitions low and a fault counter (Fault) is incremented. Next, the machine transitions from the present state S4, along the path S41, to the next state S1.

In state S3, when the counter (ctr) is greater than or equal to the local on-time, the machine transitions from the state S3, along path S31B, to the next state S1 and a truncate variable (truncate) is set to zero indicating a normal termination of the EHC_DRIVE pulse and a time remaining variable (T_remain) is set to zero. In state S3, when the instantaneous resistance is greater than or equal to the target resistance, the state transitions along the path state S31A and the truncate variable is set to a value of one (indicating the variable Local_on time was too long) and the time remaining variable (T_remain) is set equal to the Local_on_time variable minus the counter (ctr). Thus, in the heating mode, the processor 102 performs a resistance calculation during each real-time loop (TREAL), while the FET 116 is on.

In a disclosed embodiment, the FET 116 is turned off if any one of the following conditions occurs: an instantaneous resistance (R_instant) of the heating element HE is greater than a target resistance (R_target), the instantaneous resistance of the heating element HE is greater than a high resistance fault (R_highfault), the instantaneous resistance of the heating element HE is less than a low resistance fault (R_lowfault) or switch on-time (as tracked by a counter (ctr)) is greater than or equal to an on-time limit (Local_on_time), which is calculated from the limit of the pulse duty cycle.

Exemplary code for executing the states and state transitions of the state machine of FIG. 3 are set forth below:

```
S1:
   OFF/
   entry: EHC_Drive=0;
   Off time=Period-On_time+T_remain;
   Local_on_time=On_time;
   ctr=1;
   DC_actual=(On_time-T_remain)/Period;
   during:
      ctr++:
S2:
   Turn_on/
   entry:
      EHC_Drive=1;
   exit:
      Resistance_start=Voltage_In/Current_In;Curr_start=Current_In;
      V_start=Voltage_In;
```

S3:
  ON/
    entry:ctr++;
      R_instant=Voltage_In/Current_In;
    during:
      EHC_Drive=1;
      ctr++;
      R_instant=Voltage_In/Current_In;
    exit:
      Current=Current_In;
      Voltage=Voltage_In;
      Resistance_end=Voltage/Current;
S4:
  Fault/
    entry:
      EHC_Drive=0; Fault++;
S11:
  [ctr>=Off_time]/ctr=1 AND [Enable is False];
S12:
  [ctr>=Off_time]/ctr=1 AND [Enable is True];
S21:
  [ctr>=Local_on_time]/Current=Current_In; Voltage=Voltage_In;
  Resistance_end=Voltage/Current; truncate=0; T_remain=0;
S23:
  [ctr<Local_on_time];
S31A:
  [R_instant>=Target_R]/truncate=1; T_remain=Local_on_time _ctr;
S31B:
  [ctr>=Local_on_time]/truncate=0;T_remain=0;
S34:
  [R_instant>R_highfault] or [R_instant<R_lowfault];
S41:
  Not conditional, occurs upon the next cycle of the state machine.

As mentioned above, according to one embodiment of the present invention, an external enable function allows a separate logic input to disable the switching action. According to yet another embodiment of the present invention, a synchronous sampling technique is used to monitor the resistance (i.e., the temperature) of the heater element HE without imparting significant energy to the element. As is shown in FIG. 3, monitoring is preferably achieved by setting TPERIOD to a large value (e.g., three seconds) while setting a duty cycle limit to zero. When utilizing these settings, the FET 116 is turned on once every period and then one or more real-time loops after turn on, the resistance of the element HE is calculated and the FET 116 is turned off. This normally results in an accurate resistance reading and a very low effective duty cycle, which translates to very low power transfer to the element. For example, if TPERIOD is set to three seconds, and TREAL is two milliseconds, the duty cycle is approximately 0.07 percent.

Figure 5:
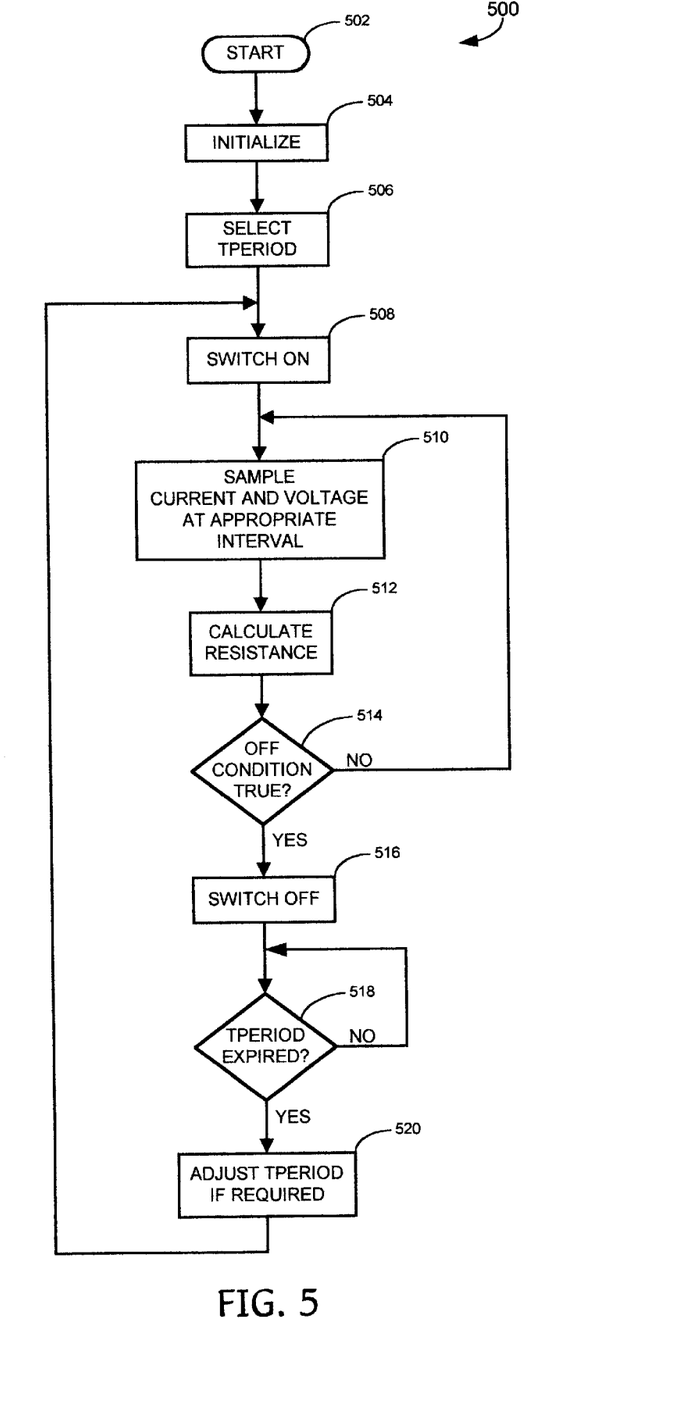
FIG. 5 is a flowchart depicting a monitor and control routine executing on a microcontroller of the control system of FIGS. 1 and 2, according to yet another embodiment of the present invention.

An exemplary control and monitoring routine 500 for monitoring and controlling a heating element HE is set forth in FIG. 5. In step 502, the routine 500 is initiated at which point control transfers to step 504 where various variables, discussed above, are initialized. Next, in step 506, the processor 102, implementing routine 500, selects an appropriate time period (TPERIOD). Next, in step 508, the processor 102 causes the FET 116 to be switched on. Then, in step 510, the processor 102 samples the current and voltage at appropriate intervals (i.e., TREAL) at the HTR_1 and the HTR_V inputs of the processor 102.

Next, in step 512, the processor 102 calculates the resistance. Then, in decision step 514, the processor 102 determines whether an off condition is true. As previously mentioned, the FET 116 is preferably turned off when the instantaneous resistance is greater than the target resistance, greater than a high fault resistance, less than a low fault resistance or when the switch on-time exceeds an on-time limit. While all of the off conditions are false control transfers from step 514 to step 510. If an off condition is true in step 514, control transitions to step 516 where the FET 116 is turned off. Next, in decision step 518, the processor 102 determines whether the TPERIOD has expired. If so, control transfers to step 520. Otherwise, control loops on step 518. In step 520, the processor 102 adjusts TPERIOD if required before transitioning to step 508.

Figure 6:
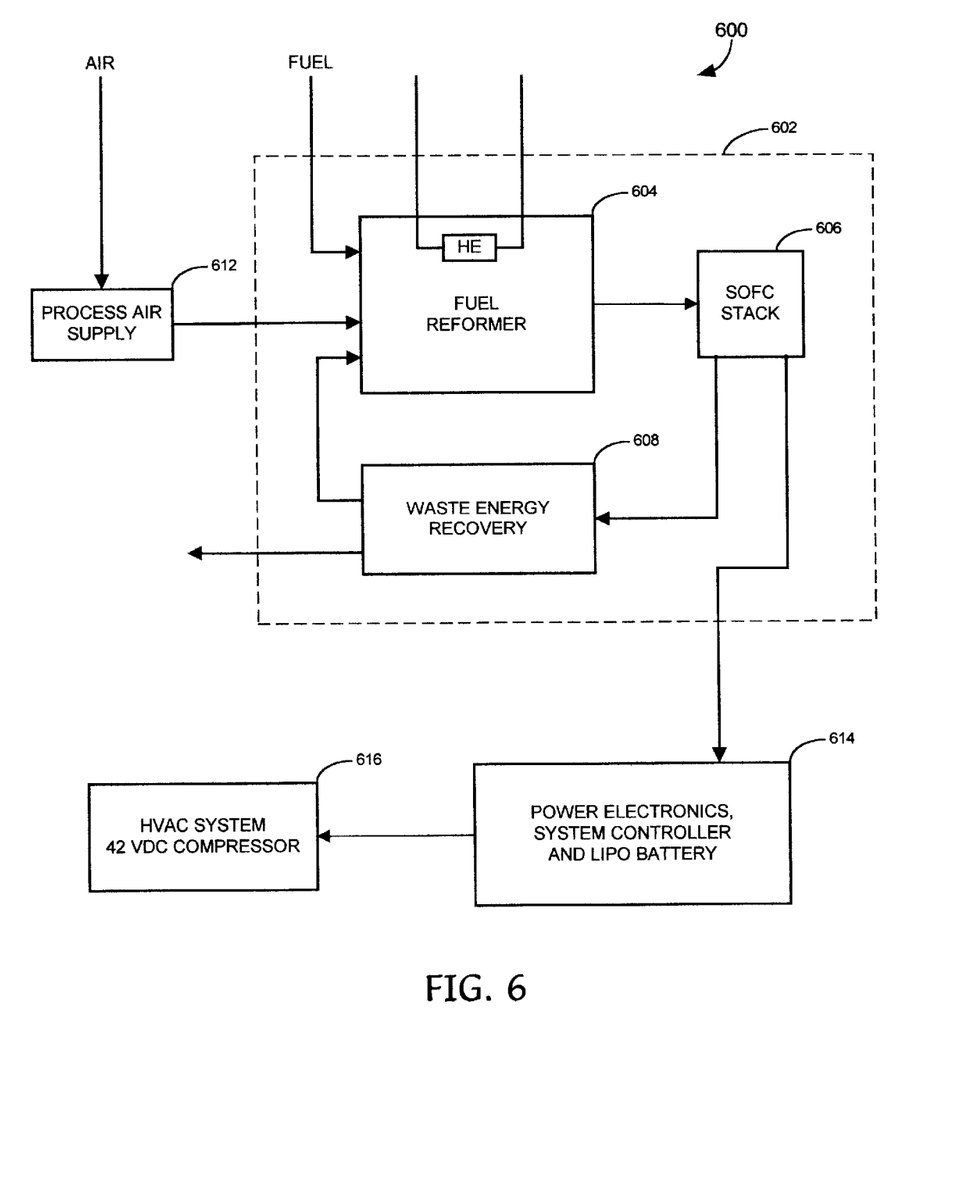
FIG. 6 is a block diagram of an exemplary solid oxide fuel cell (SOFC) auxiliary power unit (APU).

FIG. 6 depicts various subsystems of a solid oxide fuel cell (SOFC) auxiliary power unit (APU). The SOFC 602 includes a fuel reformer 604 that receives air from a process air supply subsystem 612 and fuel from an external fuel source. The fuel reformer 604 includes a heating element HE that is monitored by a control system, according to an embodiment of the present invention, as previously described herein. The control system may, for example, be incorporated with a system controller block 614. A typical fuel reformer includes a micro-reformer for starting the system and heating the main reformer and a main reformer for fueling the system once the fuel reformer is initiated. A typical APU uses a partial oxidation reformer that utilizes gasoline and air to catalytically convert the gasoline and air, primarily to hydrogen, carbon monoxide and nitrogen.

Typically, the fuel reformer 604 is housed inside a hot box 602 and operates at a high temperature (e.g., 650–800 degrees C.). A typical fuel reformer is fed fuel and air through valves located in a main plenum chamber. The fuel is introduced through insulated walls by way of an injector and the output of the reformer 604, which generally includes a hydrogen and carbon monoxide fuel mixture, is fed to the SOFC stack 606. A typical SOFC stack includes a multilayer ceramic/metal composite structure, which is designed to produce electricity at operating temperatures around 650–850 degrees C. A waste energy recovery subsystem 608 serves to convert unused reformate fuel and thermal energy, output from the stack 606, to input thermal energy for the fuel reformer 604. A typical process air subsystem 612 includes an electrical powered blower fan that pressurizes each chamber for process air cooling and purging of the SOFC system. In this manner, the SOFC APU system 600 provides auxiliary electrical power for automotive accessories normally with higher efficiency than conventional systems and can do so during extended engine off periods. A typical system 600 provides power at about five kilowatts and approximately forty-two volts.

Accordingly, a control system has been described that monitors and controls the temperature of a heating element HE without substantially affecting the current through or the voltage across a heating element. Such a control system is particularly advantageous when utilized to control a heating element HE of a micro-reformer implemented within an automotive APU.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A control system for an electric heater, comprising:
   a current sensor positioned to sense a heating current through a heating element of an electric heater;
   a voltage sensor positioned across the heating element to sense a heating voltage;
   a switching element including a control terminal, wherein the switching element is coupled between the heating element and a power supply to interrupt the heating current through the heating element responsive to a control signal on the control terminal; and
   a control circuit coupled to the current sensor, the voltage sensor and the control terminal of the switching element, wherein the control circuit varies the control signal to maintain a temperature of the heating element within a predetermined temperature range.

2. The system of claim 1, wherein the current sensor is a non-contact inductive current sensor.

3. The system of claim 2, wherein the current sensor includes a low-pass filter.

4. The system of claim 1, wherein the control circuit is a microcontroller.

5. The system of claim 1, wherein the voltage sensor includes a differential amplifier whose inputs are coupled across the heating element.

6. The system of claim 1, wherein a resistance of the heating element is in a range of about twenty-five to one-hundred milliohms when the temperature of the heating element is within the predetermined temperature range.

7. The system of claim 1, wherein the control circuit maintains the temperature of the heating element within the predetermined temperature range by periodically varying at least one of a pulse width and a frequency of the control signal to maintain a substantially constant heater resistance as calculated from the heater current provided by the current sensor and the heater voltage provided by the voltage sensor.

8. The system of claim 1, wherein the electric heater is an electric catalyst heater (ECH).

9. An auxiliary power unit (APU), comprising:
   a fuel reformer, including:
      an electric heater; and
      a control system for monitoring a temperature of the electric heater, the control system including:
         a current sensor positioned to sense a heating current through a heating element of the electric heater;
         a voltage sensor positioned across the heating element to sense a heating voltage;
         a switching element including a control terminal, wherein the switching element is coupled between the heating element and a power supply to interrupt the heating current through the heating element responsive to a control signal on the control terminal; and
         a control circuit coupled to the current sensor, the voltage sensor and the control terminal of the switching element, wherein the control circuit varies the control signal to maintain the temperature of the heating element within a predetermined temperature range; and
   a solid oxide fuel cell receiving reformate from the fuel reformer.

10. The APU of claim 9, wherein the current sensor is a non-contact inductive current sensor.

11. The APU of claim 10, wherein the current sensor includes a low-pass filter.

12. The APU of claim 9, wherein the control circuit is a microcontroller.

13. The APU of claim 9, wherein the voltage sensor includes a differential amplifier whose inputs are coupled across the heating element.

14. The APU of claim 9, wherein a resistance of the heating element is in a range of about twenty-five to one-hundred milliohms when the temperature of the heating element is within the predetermined temperature range.

15. The APU of claim 9, wherein the control circuit maintains the temperature of the heating element within the predetermined temperature range by periodically varying at least one of a pulse width and a frequency of the control signal to maintain a substantially constant heater resistance as calculated from the heater current provided by the current sensor and the heater voltage provided by the voltage sensor.

16. The APU of claim 9, wherein the electric heater is an electric catalyst heater (ECH).

17. An automotive control system for an electric catalyst heater (ECH), comprising:
   a current sensor positioned to sense a heating current through a heating element of an ECH;
   a voltage sensor positioned across the heating element to sense a heating voltage;
   a switching element including a control terminal, wherein the switching element is coupled between the heating element and a power supply to interrupt the heating current through the heating element responsive to a control signal on the control terminal; and
   a control circuit coupled to the current sensor, the voltage sensor and the control terminal of the switching element, wherein the control circuit varies the control signal to maintain a temperature of the heating element within a predetermined temperature range.

18. The system of claim 17, wherein the current sensor includes a non-contact inductive current sensor and a low-pass filter.

19. The system of claim 17, wherein the voltage sensor includes a differential amplifier whose inputs are coupled across the heating element.

20. The system of claim 17, wherein the control circuit is a microcontroller, and wherein the microcontroller is programmed to maintain the temperature of the heating element within the predetermined temperature range by periodically varying at least one of a pulse width and a frequency of the control signal to maintain a substantially constant heater resistance as calculated from the heater current provided by the current sensor and the heater voltage provided by the voltage sensor.

* * * * *